April 26, 1927.
E. E. SWITZER
1,626,436
ASBESTOS CROWN TYPE PACKING
Filed Jan. 26, 1926
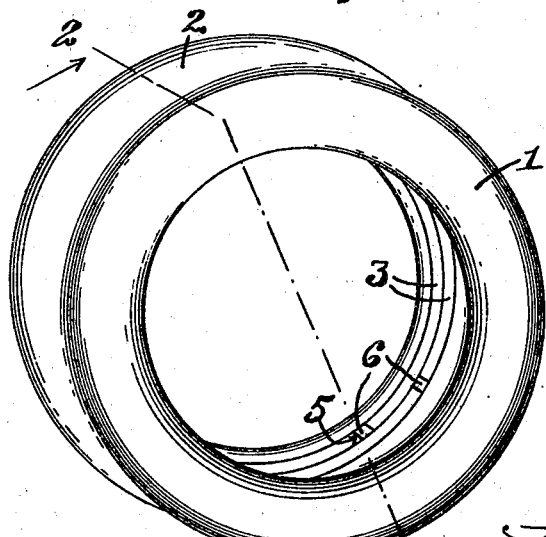
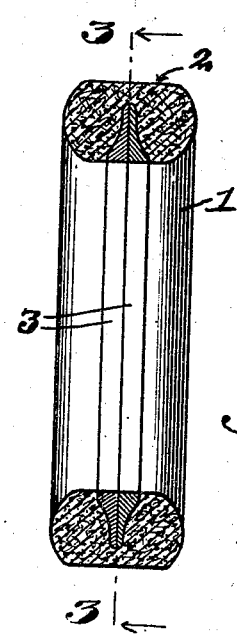
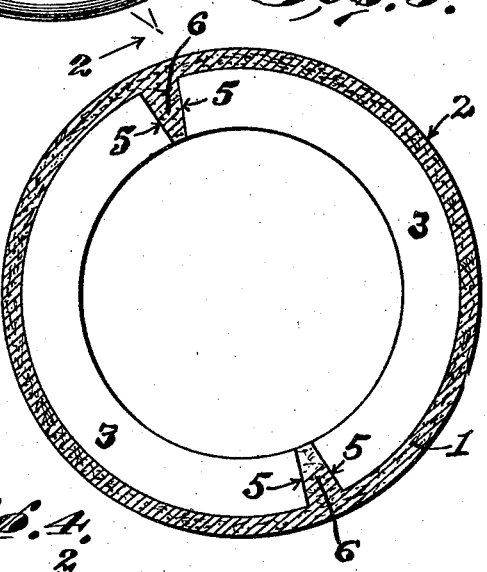
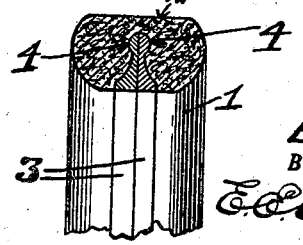
INVENTOR.
Elmer E. Switzer.
BY
ATTORNEYS.

Patented Apr. 26, 1927.

1,626,436

UNITED STATES PATENT OFFICE.

ELMER E. SWITZER, OF BEAUMONT, TEXAS.

ASBESTOS CROWN-TYPE PACKING.

Application filed January 26, 1926. Serial No. 83,910.

This invention relates to an asbestos crown-type packing, and has for its object the production of a packing that includes a broad body of asbestos having embedded and peculiarly secured therein metal segments that constitute metallic rings.

This type of a packing is an improvement upon the type of a packing disclosed in my pending United States application Ser. No. 54,243, "metallic packing".

With the foregoing and other objects in view, my invention comprises certain novel constructions, combinations, and arrangements of parts as will be hereinafter fully described, illustrated in the accompanying drawings, and more particularly pointed out in the appended claims.

In the drawings:

Figure 1 is a perspective view of a packing constructed in accordance with the present invention.

Figure 2 is a sectional view taken on line 2—2, Figure 1, and looking in the direction of the arrows.

Figure 3 is a sectional view taken on line 3—3, Figure 2, and looking in the direction of the arrows.

Figure 4 is a transverse sectional view of the preferred form or type of my asbestos packing.

Referring to the drawings by numerals, 1 comprises the broad tightly compressed asbestos body with a wide flat outer face 2, and embedded in the body are metallic segments 3; these curved segments 3 constitute a pair of contacting rings in the body.

In the embodiment shown in Figure 4, beads 4 are formed upon the inner edge of each curved segment 3. The ends 5 of the segments are bevelled (Fig. 3), producing an efficient V-shaped pocket between the contiguous ends of the segments, into which, while forming the packing, the asbestos is forced, thereby forming a key 6 of asbestos between the ends; in other words, the asbestos body enters between the ends of the segments, as well as enclosing the sides and inner edges of the segments, whereby the metallic rings, constituted by the segments 3 are formed as a substantial part of the entire packing. The segments, by reason of having the body with integral keying portions 6 between the ends, can not work loose, and, therefore, produces a very efficient packing.

Further, the beads 4 also assist in holding the segments in place, but not as efficiently as the integral key parts 6 of the body, and, therefore, I have produced a valuable improvement in this particular in asbestos-body packings.

Upon referring to the drawing, it will be noted that the asbestos has at least one eighth inch bearing on the rods on either side of the metallic rings to form a seal. This structure is necessary where oil is involved at a temperature of 930 degrees and 500 lbs. pressure.

It is to be readily understood that by sliding one segment 3 by another segment, the laps form a perfect ring. If my rings should be made in one piece, with a ship lap to make the joint, this would increase the cost of manufacture by three times more than the construction of my invention as shown in the official drawings and hereinbefore specifically described. It is also to be noted that in my design of the rings, when the packing is tightened, the metallic rings will follow the wear where the rings must close in as they wear. However, if the rings were solid, they would be stiffer.

Referring particularly to Figure 4: Doubtless many hardly realize what 930 degrees of heat and 500 lbs. of pressure means. It is a common fact that stills are at 500 lbs. now more than they are at 280 lbs. All solid metallic packings need a heavy oil as a seal. Now, after oil passes six or seven hundred degrees of heat, the lubricating properties are gone, and the oil is becoming gasoline at 950 degrees temperature. All mechanical devices with springs and the like for a take-up will not stand the heat, and, consequently, I use my type of an asbestos packing to stand the heat. Now, in Figure 4, the asbestos is drawn so tight in this instance to keep the hot oil from penetrating the asbestos; in the structure shown in Figure 2, the rings will be pressed on the rod too hard, whereas in Figure 4 which shows the bead on segments 3, this structure acts as a counterbalance, so to speak.

By my structure of a packing as herein described, it can be used in handling hot oil at 930 degrees of heat and 280 lbs. pressure.

While I have described the preferred embodiments of my invention and illustrated the same in the accompanying drawings, certain minor changes or alterations may appear to one skilled in the art to which this invention relates, during the extensive manufacture of the same, and I, therefore, reserve the right to make such changes or alterations as shall fairly fall within the scope of the appended claims.

What I claim is:

1. In a device of the class described, the combination of a circular asbestos body, rings embedded in said body and having their inner faces contacting throughout their length, each ring comprising segments curved throughout their length, and portions of said asbestos body between the contiguous ends of the segments in each ring.

2. In a device of the class described, the combination of a circular asbestos body, a pair of rings embedded in said body and having flat, parallel inner faces contacting their entire length and height, each ring comprising segments curved throughout their length, the segments in one ring having their ends opposite to solid portions in the segments of the other ring, and portions of said asbestos body between the contiguous ends of the segments of both rings.

3. In a device of the class described, the combination of a circular asbestos body, a pair of parallel contacting rings embedded in said body, each ring comprising segments curved throughout their length, each segment provided with bevelled ends, the contiguous ends of the segments in each pair of rings producing V-shaped pockets with the broadest portion of each pocket near the outer face of said asbestos body, and portions of said asbestos body filling said V-shaped pockets.

In testimony whereof I hereunto affix my signature.

ELMER E. SWITZER.